(12) United States Patent
Zhang et al.

(10) Patent No.: US 10,381,856 B2
(45) Date of Patent: Aug. 13, 2019

(54) INDUCTIVE CHARGING HOLSTER FOR POWER TOOL

(71) Applicants: Yizhuo Zhang, Arlington Heights, IL (US); Marco Laubach, Wheeling, IL (US); Steve Cole, Lombard, IL (US)

(72) Inventors: Yizhuo Zhang, Arlington Heights, IL (US); Marco Laubach, Wheeling, IL (US); Steve Cole, Lombard, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 549 days.

(21) Appl. No.: 14/873,766

(22) Filed: Oct. 2, 2015

(65) Prior Publication Data

US 2016/0099606 A1 Apr. 7, 2016

Related U.S. Application Data

(60) Provisional application No. 62/059,333, filed on Oct. 3, 2014.

(51) Int. Cl.
*H02J 7/00* (2006.01)
*H02J 7/02* (2016.01)
(Continued)

(52) U.S. Cl.
CPC ............ *H02J 7/025* (2013.01); *H02J 7/0044* (2013.01); *H02J 7/0045* (2013.01); *H02J 7/04* (2013.01); *H02J 50/10* (2016.02); *H02J 50/90* (2016.02)

(58) Field of Classification Search
CPC ........... H02J 50/10; H02J 7/0044; H02J 7/025
(Continued)

(56) References Cited

U.S. PATENT DOCUMENTS 3,940,154 A * 2/1976 Olsson .................. F16J 15/162
277/381
4,032,806 A * 6/1977 Seely ........................ B25F 5/02
310/50
(Continued)

FOREIGN PATENT DOCUMENTS

DE 10 2012 111 321 A1 5/2014
DE 10 2013 226 220 A1 6/2014
(Continued)

OTHER PUBLICATIONS

International Search Report and Written Opinion corresponding to PCT Application No. PCT/US2015/053768, dated Jan. 14, 2016 (9 pages).

*Primary Examiner* — Robert J Grant
*Assistant Examiner* — John T Trischler
(74) *Attorney, Agent, or Firm* — Maginot, Moore & Beck LLP

(57) ABSTRACT

A wireless charging system for a power tool includes a charging module, docking frame, and tool holder. The charging module has a charging surface and an inductive charging device for charging a power tool resting on the charging surface, and is mounted in the docking frame, which is mounted in a mounting interface of the tool holder such that the charging surface is at an angle. The tool holder further includes a holding portion extending from a downward portion of the mounting interface such that the holding portion transversely supports the power tool. A soft insert structure received in the holding portion forms an interference fit with the power tool and applies a load to the power tool toward the charging surface that urges the power tool to an optimal location for charging, relative to the inductive charging device.

17 Claims, 8 Drawing Sheets

(51) Int. Cl.
 *H02J 7/04* (2006.01)
 *H02J 50/10* (2016.01)
 *H02J 50/90* (2016.01)

(58) Field of Classification Search
 USPC .................................................. 320/108, 107
 See application file for complete search history.

(56) References Cited

U.S. PATENT DOCUMENTS

| | | | | |
|---|---|---|---|---|
| 4,213,078 | A * | 7/1980 | Ferrell | H01M 2/1055 320/107 |
| 4,403,182 | A * | 9/1983 | Yeh | H01M 2/10 320/110 |
| 4,591,777 | A * | 5/1986 | McCarty | H02J 7/0013 15/DIG. 1 |
| 4,677,362 | A * | 6/1987 | House, II | B25F 5/00 224/192 |
| 4,739,242 | A * | 4/1988 | McCarty | H02J 7/0013 30/DIG. 1 |
| 4,917,281 | A * | 4/1990 | Ostermiller | A45F 5/02 224/240 |
| 5,030,902 | A * | 7/1991 | Mattinger | B26B 19/286 30/DIG. 1 |
| 5,138,245 | A * | 8/1992 | Mattinger | B26B 19/286 30/DIG. 1 |
| 5,144,217 | A * | 9/1992 | Gardner | H01M 2/1055 320/110 |
| 5,159,256 | A * | 10/1992 | Mattinger | B26B 19/286 30/DIG. 1 |
| 5,686,810 | A * | 11/1997 | Yasui | H01M 10/46 320/107 |
| 5,903,132 | A * | 5/1999 | Ohira | H04M 1/0262 320/107 |
| 5,903,645 | A * | 5/1999 | Tsay | B60R 11/0241 248/316.4 |
| 5,959,433 | A | 9/1999 | Rohde | |
| 6,223,835 | B1 * | 5/2001 | Habedank | B25F 5/02 173/217 |
| 6,357,533 | B1 * | 3/2002 | Buchholz | B25F 5/02 173/217 |
| 6,412,572 | B2 * | 7/2002 | Habedank | B25F 5/02 173/217 |
| 6,436,564 | B1 * | 8/2002 | Witzigreuter | H01M 12/06 383/103 |
| 6,515,451 | B2 * | 2/2003 | Watson | B25F 5/02 320/114 |
| 6,525,511 | B2 * | 2/2003 | Kubale | B25F 5/02 320/112 |
| 6,558,082 | B1 * | 5/2003 | Courtney | B63C 9/1055 116/26 |
| 6,621,246 | B2 * | 9/2003 | Kubale | B25F 5/02 320/112 |
| 6,803,744 | B1 * | 10/2004 | Sabo | H02J 50/90 320/108 |
| 6,876,173 | B2 * | 4/2005 | Mastaler | B25F 5/02 320/114 |
| 6,965,214 | B2 * | 11/2005 | Kubale | B25F 5/02 320/114 |
| 7,005,206 | B2 * | 2/2006 | Lawrence | H01M 8/04186 429/447 |
| 7,032,872 | B2 * | 4/2006 | Sullivan | F16M 13/00 248/346.06 |
| 7,134,364 | B2 * | 11/2006 | Kageler | B25F 5/00 173/216 |
| 7,160,132 | B2 * | 1/2007 | Phillips | B25F 5/02 439/341 |
| 7,197,961 | B2 * | 4/2007 | Kageler | B25B 21/00 173/217 |
| 7,453,234 | B2 * | 11/2008 | Phillips | B25F 5/02 307/150 |
| 7,456,608 | B2 * | 11/2008 | Kageler | B25F 5/00 307/64 |
| 7,489,111 | B2 * | 2/2009 | Wise | A45F 5/021 224/223 |
| 7,523,528 | B2 * | 4/2009 | Carnevali | A45F 5/00 24/523 |
| 7,546,785 | B2 * | 6/2009 | Roehm | B25B 21/00 320/114 |
| 7,551,458 | B2 * | 6/2009 | Carnevali | B60R 11/0252 174/520 |
| 7,557,537 | B2 * | 7/2009 | Zick | H01M 2/1016 320/114 |
| 7,571,522 | B2 * | 8/2009 | Carnevali | A45F 5/00 24/3.1 |
| 7,576,513 | B1 * | 8/2009 | Nierescher | H01M 10/44 320/107 |
| 7,609,027 | B2 * | 10/2009 | Zick | H01M 2/1016 320/114 |
| 7,629,766 | B2 * | 12/2009 | Sadow | H02J 7/0044 173/217 |
| 7,647,676 | B2 * | 1/2010 | Carnevali | A45F 5/00 24/523 |
| 7,705,558 | B2 * | 4/2010 | Silverman | H01M 10/0427 320/108 |
| 7,723,953 | B2 * | 5/2010 | Roehm | B25B 21/00 320/114 |
| 7,736,792 | B2 * | 6/2010 | Moores, Jr. | B25F 5/008 429/120 |
| 7,786,622 | B2 * | 8/2010 | Swan | H02J 7/025 307/104 |
| 7,868,585 | B2 * | 1/2011 | Sarnowsky | H02J 7/0042 320/108 |
| 7,868,589 | B2 * | 1/2011 | McSweyn | H02J 7/0044 320/107 |
| 7,868,590 | B2 * | 1/2011 | Zick | H01M 2/1016 320/114 |
| 7,944,173 | B2 * | 5/2011 | Johnson | H01M 2/1055 320/112 |
| 8,115,448 | B2 * | 2/2012 | John | A61N 1/3785 320/108 |
| 8,176,603 | B2 * | 5/2012 | Carnevali | F16M 11/041 24/522 |
| 8,183,825 | B2 * | 5/2012 | Sa | H02J 7/0044 320/107 |
| 8,193,768 | B2 * | 6/2012 | Hallett | G10H 1/32 320/108 |
| 8,203,307 | B2 * | 6/2012 | Zick | H01M 2/1016 320/114 |
| 8,228,026 | B2 * | 7/2012 | Johnson | A47B 96/02 320/108 |
| 8,253,377 | B2 * | 8/2012 | Meincke | H04R 25/602 320/115 |
| 8,294,300 | B2 * | 10/2012 | Cook | H01Q 1/248 307/104 |
| 8,346,324 | B2 * | 1/2013 | Lowles | H02J 7/0044 455/450 |
| 8,354,183 | B2 * | 1/2013 | Konuma | B25F 5/02 320/114 |
| 8,482,160 | B2 | 7/2013 | Johnson et al. | |
| 8,482,252 | B2 * | 7/2013 | Byrne | G11B 33/122 320/113 |
| 8,508,189 | B2 * | 8/2013 | Osswald | H02J 7/0045 320/114 |
| 8,680,869 | B2 * | 3/2014 | Jiang | H01R 13/2421 320/115 |
| 8,729,854 | B2 * | 5/2014 | Tsai | H02J 5/005 320/108 |
| 9,019,698 | B2 * | 4/2015 | Thiers | H04W 88/02 248/922 |
| 9,136,729 | B2 * | 9/2015 | Ashinghurst | H02J 7/025 |
| 9,240,702 | B2 * | 1/2016 | Soar | H01F 27/365 |
| 9,319,086 | B2 * | 4/2016 | Wong | H04B 1/3883 |
| 9,325,196 | B2 * | 4/2016 | Park | H02J 7/025 |
| 9,531,207 | B2 * | 12/2016 | Lowles | H02J 7/0044 |
| 9,537,336 | B2 * | 1/2017 | Suzuki | H02J 7/0027 |
| 9,553,471 | B2 * | 1/2017 | Chinnadurai | H02J 7/025 |
| 9,577,450 | B2 * | 2/2017 | Yoshikawa | H02J 7/0044 |
| 9,660,229 | B2 * | 5/2017 | Chellew | B25F 5/00 |

(56) References Cited

U.S. PATENT DOCUMENTS

| | | | | |
|---|---|---|---|---|
| 9,721,723 B2* | 8/2017 | Lohr | | H01F 38/14 |
| 9,724,098 B2* | 8/2017 | Baxter, III | | A61B 17/068 |
| 9,724,821 B2* | 8/2017 | Rejman | | B25H 3/02 |
| 9,742,208 B2* | 8/2017 | Stratton | | H02J 7/0044 |
| 9,793,744 B2* | 10/2017 | Zhang | | H02J 7/025 |
| 9,887,576 B2* | 2/2018 | Zhang | | H02J 7/025 |
| 9,905,966 B2* | 2/2018 | Burger | | H01R 13/631 |
| 9,912,174 B2* | 3/2018 | Soar | | H02J 50/12 |
| 9,918,716 B2* | 3/2018 | Baxter, III | | A61B 17/105 |
| 9,923,402 B2* | 3/2018 | Breitenbach | | H02J 7/025 |
| 9,935,483 B2* | 4/2018 | Krupezevic | | H02J 7/025 |
| 9,974,538 B2* | 5/2018 | Baxter, III | | A61B 17/0643 |
| 2001/0040036 A1* | 11/2001 | Habedank | | B25F 5/02 173/217 |
| 2002/0195883 A1* | 12/2002 | Lazzaro | | H01H 47/002 307/326 |
| 2002/0197522 A1* | 12/2002 | Lawrence | | H01M 8/04186 429/447 |
| 2005/0134218 A1* | 6/2005 | Corbins | | H02J 7/0042 320/115 |
| 2005/0218867 A1* | 10/2005 | Phillips | | B25F 5/02 320/114 |
| 2005/0218868 A1* | 10/2005 | Phillips | | B25F 5/02 320/114 |
| 2005/0221654 A1* | 10/2005 | Phillips | | B25F 5/02 439/347 |
| 2005/0257352 A1* | 11/2005 | Carnevali | | A45F 5/00 24/523 |
| 2006/0110656 A1 | 5/2006 | Moores, Jr. et al. | | |
| 2006/0192527 A1* | 8/2006 | Kageler | | B25F 5/00 320/115 |
| 2006/0285306 A1* | 12/2006 | Carnevali | | B60R 11/0252 361/758 |
| 2007/0022582 A1* | 2/2007 | Carnevali | | A45F 5/00 24/523 |
| 2007/0022583 A1* | 2/2007 | Carnevali | | A45F 5/00 24/523 |
| 2007/0120527 A1* | 5/2007 | Roehm | | B25B 21/00 320/114 |
| 2007/0132428 A1* | 6/2007 | Wise | | A45F 5/021 320/114 |
| 2007/0205744 A1* | 9/2007 | Corbins | | H02J 7/0042 320/103 |
| 2007/0227310 A1* | 10/2007 | Roehm | | B25F 5/021 81/54 |
| 2008/0306417 A1* | 12/2008 | Imboden | | A61H 19/00 601/134 |
| 2009/0058361 A1* | 3/2009 | John | | A61N 1/3785 320/128 |
| 2009/0096430 A1* | 4/2009 | Van Der Linde | | H01H 13/18 320/166 |
| 2009/0200984 A1* | 8/2009 | Meincke | | H04R 25/602 320/107 |
| 2009/0211410 A1* | 8/2009 | Roehm | | B25B 21/00 81/436 |
| 2009/0212639 A1* | 8/2009 | Johnson | | H02J 7/025 307/104 |
| 2009/0212737 A1* | 8/2009 | Johnson | | A47B 96/02 320/108 |
| 2009/0237031 A1* | 9/2009 | McSweyn | | H02J 7/0044 320/114 |
| 2010/0237823 A1* | 9/2010 | Silverman | | H01M 10/0427 320/101 |
| 2010/0248177 A1* | 9/2010 | Mangelberger | | A61C 1/12 433/25 |
| 2011/0057083 A1* | 3/2011 | Carnevali | | A45F 5/00 248/274.1 |
| 2011/0062789 A1* | 3/2011 | Johnson | | A47B 96/20 307/104 |
| 2011/0068741 A1* | 3/2011 | Liu | | F21V 33/00 320/114 |
| 2011/0095724 A1* | 4/2011 | Byrne | | G11B 33/122 320/115 |
| 2011/0133695 A1* | 6/2011 | Cadway | | B25F 5/00 320/114 |
| 2011/0181238 A1* | 7/2011 | Soar | | B60N 2/24 320/108 |
| 2012/0206096 A1* | 8/2012 | John | | A61N 1/3785 320/108 |
| 2012/0223676 A1* | 9/2012 | Petrick | | G06F 1/1628 320/115 |
| 2012/0229083 A1* | 9/2012 | Matthias | | B25F 5/00 320/108 |
| 2013/0088193 A1 | 4/2013 | Chen | | |
| 2013/0113419 A1* | 5/2013 | Lowles | | H02J 7/0044 320/107 |
| 2013/0257147 A1* | 10/2013 | Murar | | H04B 5/0037 307/9.1 |
| 2013/0271070 A1 | 10/2013 | Hirano | | |
| 2013/0307472 A1* | 11/2013 | Rejman | | B25H 3/02 320/108 |
| 2013/0314055 A1* | 11/2013 | Van Der Linde | | H01H 13/18 320/167 |
| 2013/0335014 A1* | 12/2013 | Ashinghurst | | H02J 7/025 320/108 |
| 2014/0035511 A1* | 2/2014 | Ferber | | H02J 7/0042 320/103 |
| 2014/0049211 A1* | 2/2014 | Park | | H02J 7/025 320/108 |
| 2014/0084860 A1* | 3/2014 | Jaax | | A61N 1/3787 320/108 |
| 2014/0111147 A1* | 4/2014 | Soar | | H01F 27/365 320/108 |
| 2014/0118016 A1* | 5/2014 | Breinlinger | | G01R 1/07357 324/750.25 |
| 2014/0159640 A1* | 6/2014 | Yoshikawa | | H02J 7/0044 320/103 |
| 2014/0176065 A1* | 6/2014 | Rejman | | H02J 7/025 320/108 |
| 2014/0266024 A1* | 9/2014 | Chinnadurai | | H02J 7/025 320/108 |
| 2014/0312842 A1* | 10/2014 | Lee | | H02J 7/0045 320/110 |
| 2014/0340034 A1* | 11/2014 | Dietzel | | B25H 3/022 320/108 |
| 2014/0361740 A1* | 12/2014 | Suzuki | | H02J 7/0027 320/108 |
| 2015/0002088 A1* | 1/2015 | D'Agostino | | H02J 7/0044 320/108 |
| 2015/0069962 A1* | 3/2015 | Dietzel | | B25H 3/02 320/108 |
| 2015/0077049 A1* | 3/2015 | Smith | | H02J 5/005 320/108 |
| 2015/0098172 A1* | 4/2015 | Kankiewicz | | H02J 7/0044 361/679.01 |
| 2015/0132988 A1* | 5/2015 | Burger | | B25F 5/00 439/374 |
| 2015/0137731 A1* | 5/2015 | Kim | | H02J 7/355 320/101 |
| 2015/0175025 A1* | 6/2015 | Barbul | | B60L 11/1829 320/108 |
| 2015/0245519 A1* | 8/2015 | Forristall | | H02J 7/0054 320/103 |
| 2015/0249353 A1* | 9/2015 | Hamilton, IV | | H02J 7/0045 320/114 |
| 2015/0318732 A1* | 11/2015 | Heine | | H02J 5/005 320/108 |
| 2015/0318733 A1* | 11/2015 | Stock | | H01F 38/14 320/108 |
| 2015/0318734 A1* | 11/2015 | Lohr | | H01F 38/14 320/108 |
| 2015/0333559 A1* | 11/2015 | Lohr | | H01F 38/14 320/108 |
| 2015/0340153 A1* | 11/2015 | Lohr | | H01F 27/2804 336/200 |
| 2015/0349576 A1* | 12/2015 | Krupezevic | | B25F 5/00 320/108 |

(56) References Cited

U.S. PATENT DOCUMENTS

| | | | | |
|---|---|---|---|---|
| 2015/0349577 A1* | 12/2015 | Breitenbach | B25F 5/00 | 320/108 |
| 2015/0357683 A1* | 12/2015 | Lohr | H01F 38/14 | 320/108 |
| 2016/0013664 A1* | 1/2016 | Maekawa | H02J 5/005 | 307/104 |
| 2016/0036478 A1* | 2/2016 | Wong | H02J 7/0044 | 455/573 |
| 2016/0072338 A1* | 3/2016 | Makwinski | H02J 7/0054 | 320/108 |
| 2016/0079762 A1* | 3/2016 | Wang | H02J 50/12 | 307/104 |
| 2016/0079800 A1* | 3/2016 | Ashinghurst | H02J 7/025 | 320/108 |
| 2016/0079801 A1* | 3/2016 | Zhang | H02J 7/025 | 320/108 |
| 2016/0094051 A1* | 3/2016 | Soar | H04B 5/0031 | 307/9.1 |
| 2016/0101291 A1* | 4/2016 | Jaax | A61N 1/3787 | 607/61 |
| 2016/0172722 A1* | 6/2016 | Rejman | H01M 10/488 | 362/119 |
| 2016/0190858 A1* | 6/2016 | Zhang | H02J 7/0045 | 320/108 |
| 2016/0192989 A1* | 7/2016 | Aman | A61B 17/1622 | 606/53 |
| 2016/0226278 A1* | 8/2016 | Wenger | H02J 7/0044 | |
| 2016/0294040 A1* | 10/2016 | Blair | H01Q 1/22 | |
| 2017/0070067 A1* | 3/2017 | Suzuki | H02J 7/0027 | |
| 2017/0104352 A1* | 4/2017 | Stratton | H02J 7/0044 | |
| 2017/0126038 A1* | 5/2017 | Yoshikawa | H02J 7/0044 | |
| 2017/0153165 A1* | 6/2017 | Nwadigo | B01L 3/0217 | |
| 2017/0259424 A1* | 9/2017 | Vetter | B25H 3/006 | |

FOREIGN PATENT DOCUMENTS

| | | |
|---|---|---|
| DE | 10 2013 226 229 A1 | 6/2014 |
| WO | 2008125194 A2 | 10/2008 |
| WO | 2013/014878 A1 | 1/2013 |
| WO | 2014020917 A1 | 2/2014 |
| WO | 2014096037 A2 | 6/2014 |
| WO | 2014096048 A2 | 6/2014 |
| WO | 2014096052 A2 | 6/2014 |

* cited by examiner

INDUCTIVE CHARGING HOLSTER FOR POWER TOOL

RELATED APPLICATION

This application claims priority to U.S. Provisional Application No. 62/059,333 filed on Oct. 3, 2014, entitled "Inductive Charging Holster for Power Tool," the disclosure of which is incorporated by reference herein in its entirety. Where a definition or use of a term in a reference is inconsistent or contrary to the definition of that term provided herein, the definition of that term provided herein applies and the definition of that term in the reference does not apply.

TECHNICAL FIELD

This disclosure relates generally to wireless chargers, and, more particularly, to wireless chargers for power tools.

BACKGROUND

A common problem associated with the use of electronic devices and tools is the necessity of powering such electronic devices. Power cords connected to an external power source provide sufficient power, but are an obtrusive and problematic interference, especially with regard to power tools which are desirably easily manipulated in and around workspaces that are often crowded and obstructed, and power tools which are desirably transported between different job sites.

Rechargeable cordless tools are a common alternative. Such systems typically include a removable rechargeable battery and a charging station. When depleted, a rechargeable battery can be removed from the tool and inserted into the charging station for charging. U.S. Pat. No. 5,144,217 describes a cordless tool battery housing and charging system that accommodates a variety of sizes and power charges of different batteries via a controlled wired charging process. Such technologies typically require not only removal of the battery from the tool in order to initiate charging, but also require a wired contact connection between the battery and charging station, which may be susceptible to damage due to, for example, moisture, dirt, or physical damage that prevents the battery from optimally coupling with the charging station.

Technology has been developed in an effort to alleviate these concerns via inductive or wireless charging. U.S. Pat. No. 8,482,160 describes a system whereby a plurality of wireless charging modules are placed underneath a workspace in order to inductively charge a secondary tool placed on the workspace in a region of one of the modules. However, such a system is expensive and complex to install, only enables wireless charging at the fixed regions of the modules, does not ensure that a tool is optimally located within a charging region for optimal charging, and is inapplicable to mobile applications. Further, such a system does not provide protection against a tool being unintentionally jostled and relocated during charging. For instance, a user might place a tool near a charging module with the expectation that the tool will charge. The user might then continue work with another device or tool, and in so doing, unintentionally move the tool away from the module, such that when the user again wishes to use the tool, it has not been charged as desired. Other conventional wireless chargers resemble pads, and are similarly unsecured.

Other types of wireless charging devices have also been developed for charging tools and other devices, and typically resemble a pad on which a device is rested to initiate charging. However, such chargers present undesirable use cases when used as a tool resting surface since they are not secured to a supporting surface, nor do they secure the tool itself from unintended motion or vibration.

In one such undesirable use case, a user is operating a power drill powered by a rechargeable battery. When the battery becomes depleted, the drill becomes inoperable. In order to resume work, the user can, for example, replace the depleted battery with a charged replacement battery, or place the battery and/or tool onto a charging station and wait for the battery to recharge. Replacing the battery requires the user to obtain, store, and maintain charging for multiple batteries, which increases the expense and complexity of operating the drill, and waiting for the battery to recharge can necessitate delays in workflow before the user can resume drilling.

Additionally, conventional wireless charging stations do not guide an optimal location of the battery/tool for optimized charging, and do not secure the battery/tool in place. As a result, the battery/tool that is not optimally placed on a wireless charging station may charge slower or may fail to completely charge. Even if optimally placed, the battery/tool may become dislodged or moved due to inadvertent contact from the user, another tool or object, or other external forces such as vibrations from machinery. In another example, a charging station is positioned in a vehicle, and a battery/tool is placed thereon for charging. During transport, motion from the vehicle can jostle the battery/tool out of position and hinder or prevent charging. These types of impacts, jostling, and vibrations can also result in damage to the battery/tool when the battery/tool is unsecured.

Therefore, what is needed is a way of charging a battery of a tool without interrupting its use or obstructing a workspace with cords or a charging station in such a way that optimally positions the tool for charging and protects against unintentional interruption of charging of the tool.

SUMMARY

The following is a brief summary of subject matter described in greater detail herein. This summary is not intended to be limiting as to the scope of this disclosure or to the claims.

In order to facilitate the charging of a power tool, a wireless charging system includes a tool holder, a docking frame mounted in the tool holder, and a charging module mounted in the docking frame so that a charging surface of the charging module is at an angle. The charging module includes an inductive charging device, and the tool holder includes a holding portion that extends from a downward region of the charging module to transversely support a power tool resting on the charging surface.

A soft insert structure is received between the power tool and the holding portion of the tool holder, and forms an interference fit between the power tool and the tool holder. Different soft insert structures enable the tool holder to receive different power tools with an interference fit. The soft insert structure applies a load to the power tool in a direction of the charging surface that urges the power tool toward a location for optimal charging relative to the inductive charging device.

A pushing device can be mounted between the charging module and the docking frame, or between the docking frame and the tool holder, and is configured to load the charging module in order to apply a force to the power tool in opposition to the load applied by the soft insert structure.

A strap or clamping device can be used to secure the power tool within the tool holder.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one of ordinary skill in the art to which this document pertains.

Figure 1:
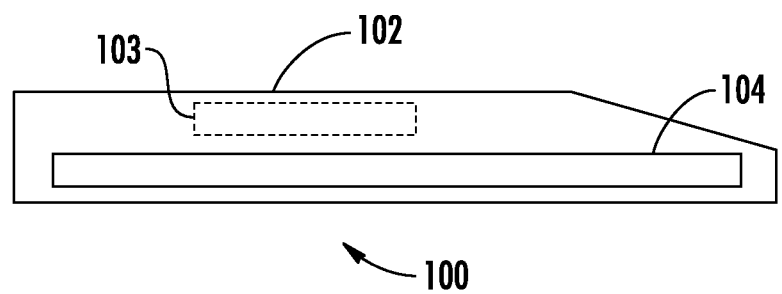
FIG. 1 is a side view of a wireless charging module according to this disclosure.
Figure 2:
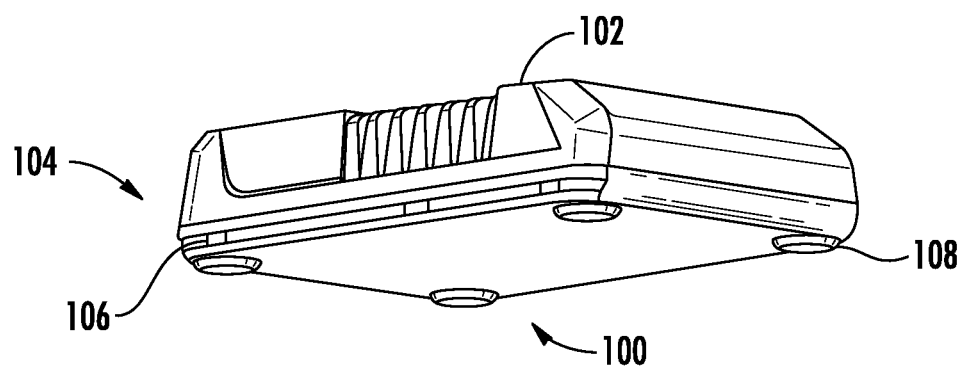
FIG. 2 is a perspective view of the wireless charging module of FIG. 1.

FIG. 1 depicts a side view and FIG. 2 depicts a perspective view of a wireless charging module 100 according to this disclosure. The wireless charging module 100 defines a charging surface 102, and includes an induction charging coil 103, a mounting interface 104, and a plurality of feet 108.

The charging surface 102 is formed by a top surface of the charging module. The induction charging coil 103 is disposed within the charging module 100, and is configured to inductively charge a rechargeable battery placed on or near a charging surface 102. Acceptable wireless inductive battery charging systems are described in U.S. Pat. No. 5,959, 433, WO2014/096052, WO2014/096037, and WO2014/ 096048. Other types of conventional inductive charging systems are also contemplated. For example, the wireless charging module 100 supports Qi inductive charging or the like.

The mounting interface 104 is disposed on the lateral sides of the charging module 100, and is configured to removably mount the charging module 100 within another structure, such as a docking frame or tool holder as discussed below, to enable rigid support of the charging module 100 on a surface, wall, tool box, vehicle, cart, work surface, or the like. As illustrated in FIG. 2, in this embodiment the mounting interface 104 includes a rail 106 configured to removably mate with a receiving interface of the other structure. In other embodiments, the mounting interface 104 can include one or more of, for example, a rail, a snap structure, a roller, or other removable mounting structures.

The plurality of feet 108 are disposed on a bottom of the charging module 100 opposite the charging surface 102, and are configured to provide at least partial damping and/or restraint against motion. For example, the plurality of feet 108 can provide at least partial damping relative to the other structure housing the charging module 100, or can provide at least partial damping when the charging module 100 is not mounted in another structure and is resting directly on an unsecured surface. The feet 108 can include rubber footing, grips, or other structure configured to arrest motion or provide damping. In another embodiment, the mounting interface 104 includes a damping material configured to provide at least partial damping between the charging module 100 and the other structure.

The charging module 100 can be used to charge a removable battery that is not connected to a tool but is instead placed directly on the charging surface 102, or can be used to charge a battery configured to remain within a tool during charging. In some cases, a battery within a tool may be spaced apart from a bottom surface of the tool. Thus, the optimal position for a battery for wireless charging via the induction charging coil 103 may be on or near the charging surface 102, or at a distance spaced apart from the charging surface 102. In an embodiment, the charging module 100 is configured to adjust the optimal charging location based on the tool or device placed on the charging surface 102.

The charging module 100 is usable to charge a variety of sizes and powers of batteries. For example, the battery can include a Lithium ion battery, a Lithium air battery, a Lithium metal battery, a Lithium sulfur battery, or a metal-air battery. The charging module 100 can also be used to charge multiple batteries or multiple tools at once In an embodiment, the charging module 100, in addition to being configured to transfer energy to charge the tool and/or battery, is further configured to transfer energy to charge at least one non-power tool device such as, for example, a battery tester, a vehicle diagnostic system, a wireless device, a wearable device, a mobile device, or a device for a vehicle.

Because the induction charging coil 103 enables wireless charging, the charging module 100 does not need a physical contact point for electrically connecting the battery/tool to the charging module. In conventional chargers, contact points can become obstructed by debris, or can be damaged such as by wear or impact, which can negatively impact the performance of the charger. Many types of contact points also require that the battery or tool is removably coupled to the charger, which necessitates a decoupling action before the battery/tool can be removed. By eliminating contact points, the charging module 100 not only removes the risk of debris or impact affecting the performance of charging a battery, but also enables maintaining a tool in an alwaysready condition where the tool is easily removable from the charging module 100 without requiring any detachment or decoupling.

The charging surface 102 of the charging module 100 can be used as a resting surface on which the tool may be placed when not in active use. In an exemplary use case, a user performing a repetitive drilling operation can iterate between operating a power drill with a rechargeable battery, and inserting a member into a hole resulting from the drilling operation. When using a conventional rechargeable drill, the battery is continually drained during operation, and continues to drain or at best holds steady when not in use. According to this disclosure, when inserting the member into the hole, the user can place the drill on the charging surface 102 of the charging module 100, and then the user can retrieve the drill for the subsequent drilling operation. In this way, the battery of the drill is at least partially recharged each time it is set aside while the user inserts a member. Because placing and removing the drill on the charging surface 102 does not require a coupling or uncoupling action, the drill can be placed and recovered without interruption to the user's workflow. Additionally, because the drill is charged whenever it is resting on the charging surface 102, the time over which the drill can be operated without stopping to recharge or replace the battery is extended relative to conventional charging systems.

In one embodiment, the charging module 100 further includes an electric plug (not shown) configured to connect the charging module 100 to an electrical power source, such as a wall socket, car power outlet, power converter, etc. In an embodiment, the charging module also includes a charging control unit (not shown) that is configured to operate the induction charging coil 103 to control a charging operation. Such a charging control unit can include a wireless communication device for communicating with, for example, a battery, a tool, a mobile device, or the like such as an RF antenna, near field communication (NFC), WiFi, Bluetooth, or the like. For example, the charging control unit can be configured to communicate with the battery and/or the tool to charge the battery based at least in part upon a charge level and/or state of the battery.

Figure 3:
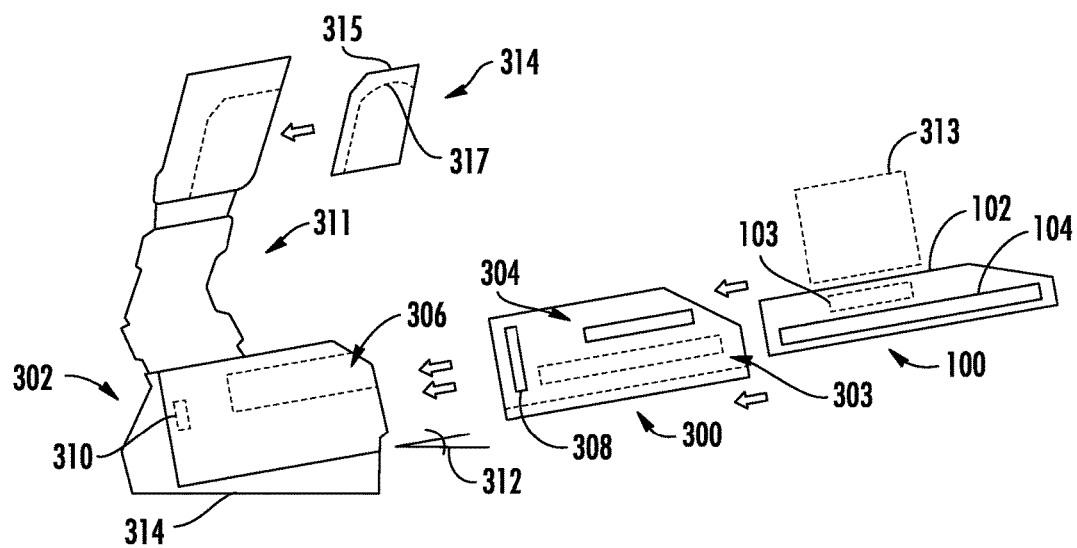
FIG. 3 is a side view of a tool holder for mounting a docking frame and the charging module of FIG. 1 according to this disclosure.
Figure 4:
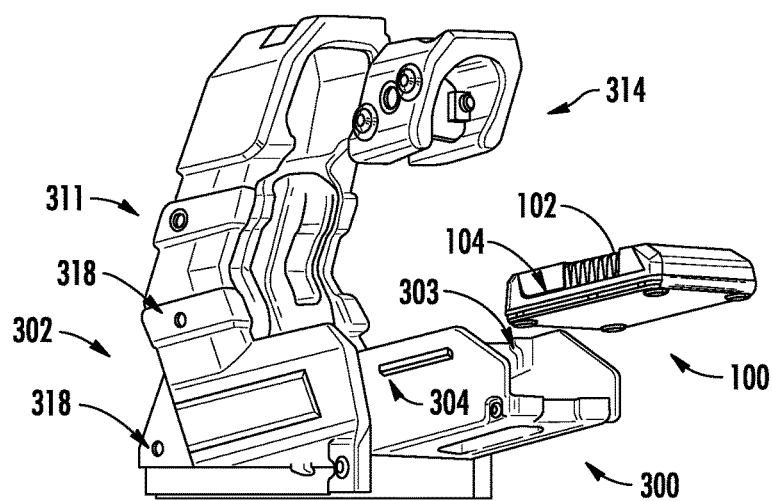
FIG. 4 is an exploded perspective view of a tool holder, docking frame, and charging module of FIG. 3.

As discussed above, mounting the charging module 100 on another structure can be beneficial for securing the battery/tool during charging or between periods of use. FIG. 3 illustrates a side view, and FIG. 4 illustrates a perspective view of a docking frame 300 and tool holder 302 for mounting the charging module 100. Advantageously, a docking frame 300 and/or tool holder 302 is not only secured to a surface, but also holds the tool in position relative to the charging module.

The docking frame 300 includes a receiving interface 303 configured to removably receive the mounting interface 104 of the charging module 100 (FIG. 2). In this embodiment, the geometry of the mounting interface 104 and the receiving interface 303 are configured to engage with each other, such as via a nub-and-slot interface, or the like.

In another embodiment, the receiving interface 303 has a geometry that is at least partially complementary to geometry of the mounting interface 104 of the charging module 100. For example, one of the receiving interface 303 and the mounting interface 104 can include a protruding rib, and the other can include a rib-shaped recession configured to slidingly receive the rib. Other types of interfaces are also contemplated, including roller interfaces, and snap interfaces, as described in further detail below.

The receiving interface 303 can also include a stop member (not shown) configured to limit an extent to which the charging module 100 can be inserted into the docking frame 300. The stop member can include, for example, a ridge protrusion, a back-wall, a cross-member, and a ridge located on a rail of the receiving interface 303

In addition to a receiving interface configured to receive a charging module (not shown), the docking frame 300 includes a second mounting interface 304 that enables the docking frame to be mounted in the tool holder 302.

The tool holder 302 includes a second receiving interface 306, a further stop member 310, and a tool holder portion 311, and defines an attachment surface 314 that forms a base of the tool holder 302.

The attachment surface 314 is configured to affix the tool holder 302 to a surface such as a desk, table, or the like. In this embodiment, the tool holder 302 further defines side attachment holes 316 on a surface perpendicular to the base 314 that are configured to mount the tool holder on a wall or side of a structure.

The second receiving interface 306 is configured to receive the mounting interface 304 of the docking frame 300 in a manner similar to the engagement between the mounting interface 104 and receiving interface 303 of the charging module 100 and docking frame 300. For example, in this embodiment, the second mounting interface 304 is a protruding rail that is configured to be slidingly received in, for example, a slot (not shown) of the second receiving interface 306, but other types of mounting interfaces are also contemplated.

The second receiving interface 306 is oriented at an angle 312 relative to the base 314 of the tool holder 302 such that the side of the second receiving interface 306 facing away from the further stop member 310 is elevated compared to the opposite side of the second receiving interface 306. Due to the angle 312, the docking frame 300, when mounted via the second receiving interface 306, is urged by gravity to slide down along the second receiving interface 306 toward the tool holding portion 311. The further stop member 310 is configured to engage with the additional stop member 308 of the docking frame 300 to delimit a range of motion of the docking frame 300 along the slot 313 into the tool holder 302.

Since the docking frame 300 is oriented at the angle 312, the charging surface 102 of the charging module 100 is also oriented at the angle 312 when the charging module 100 is mounted in the docking frame 300. In other words, the charging module 100 is oriented such that the charging surface 102 slopes downward toward the tool holding portion 311.

In another embodiment, (not shown) the charging module 100 may be directly mounted in the second receiving interface 306. For example, a charging module may be of a size that is too large for the docking frame 300, and thus the mounting interface of the large size charging module is configured to directly engage the second mounting interface 306.

The tool holder portion 311 extends upwards from a region of the second receiving interface 306 proximate to the further stop member 310, and is configured to at least partially support the body of a tool disposed on the charging surface 102. Because the charging surface 102 is oriented at the angle 312, the tool is urged by gravity into the tool holder portion 311. The magnitude of the angle 312 is selected to enable a user to insert and remove the tool from the tool holder portion 302 via a swiping motion that results in a bottom surface of the tool sliding against the charging surface 102 so as to clear any debris disposed thereon. The tool holder 311 thus acts as a transverse support for a device resting on the sloped charging surface 102.

The tool holding portion 311 is configured to counteract motion such as road vibrations so that the tool is kept optimally positioned relative to the charging surface 102 for charging the battery. Advantageously, the tool holding portion 311 is configured to apply a load to the tool that acts to keep the battery within the tool optimally positioned relative to the charging surface 102. The load applied by the tool holding portion 311 is counteracted by the charging surface 102 of the charging module. When a tool is placed on the charging module 100 mounted in the docking frame 300 and tool holder 302 as illustrated in FIGS. 3 and 4, the load applied by the tool holding portion 311 and the counteraction of the charging surface 102 act compressively on the tool in order to securely hold the tool in the tool holder at an optimal location for charging the tool via the charging module 100.

Specifically, the tool holding portion 311 is configured such that the load is applied in a direction along a centerline of an induction coil of the battery within the tool such that the centerline of the induction coil of the battery is held within a tolerance zone 313 of a centerline of the induction coil 103 of the charging module 100. The tolerance zone 313 of the charging module 100 is determined based at least in part upon design characteristics of the particular charging module 100 being used, and defines a region within which the battery is optimally charged. In one aspect, the tool holding portion 311 is configured such that an orientation of the load is determined by an orientation of the induction coil of at least one of the battery and the charging module 100, and is not determined by a shape or orientation of the tool.

The tool holding portion 311 further includes a soft insert structure 314 configured to receive the tool. The soft insert structure 314 is advantageously a removable structure as illustrated in FIGS. 3 and 4, but in some embodiments, the soft insert structure 314 is integral with the tool holding portion 311. In such embodiments, different soft insert structures 314 can be used to mount different tools in the tool holder 302.

The soft insert structure 314 is further configured to have an interference fit with the tool, whereby the interference fit acts as at least a part of a source of the load acting on the tool. While a hard insert structure may also be acceptable to receive the tool in the tool holding portion 311, the soft insert structure 314 includes a soft material that provides damping in restraining the tool. In one embodiment, the soft insert structure 314 includes a hard surface or shell 315 configured to mate with the tool holding portion 311 and a soft receiving area 317 configured to receive the tool.

Figure 5:
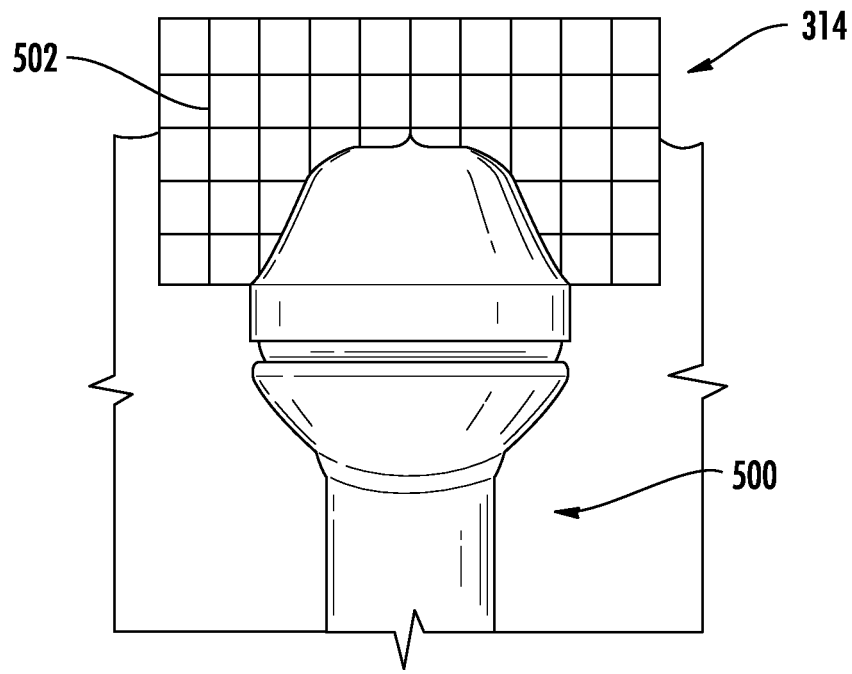
FIG. 5 is a rear view of an exemplary embodiment of a soft insert structure for a tool according to this disclosure.

In one embodiment illustrated in FIG. 5, the soft insert structure 314 is formed from a foam material. In an embodiment, foam material is molded into a soft insert structure 314 for a particular tool 500 desirably mounted in the tool holder 302. In another embodiment, a generic foam structure is cut in order to reshape the foam structure into a soft insert structure 314 for a particular tool. In one embodiment of a foam structure, the foam structure includes cut guides 502 for a plurality of sections of the foam structure configured to guide cutting of the foam structure for a plurality of different soft insert structures 314. For example, the cut guides 502 can be used by a user to cut a generic foam structure to fit a tool holding portion 311 and/or a particular tool.

Figure 6:
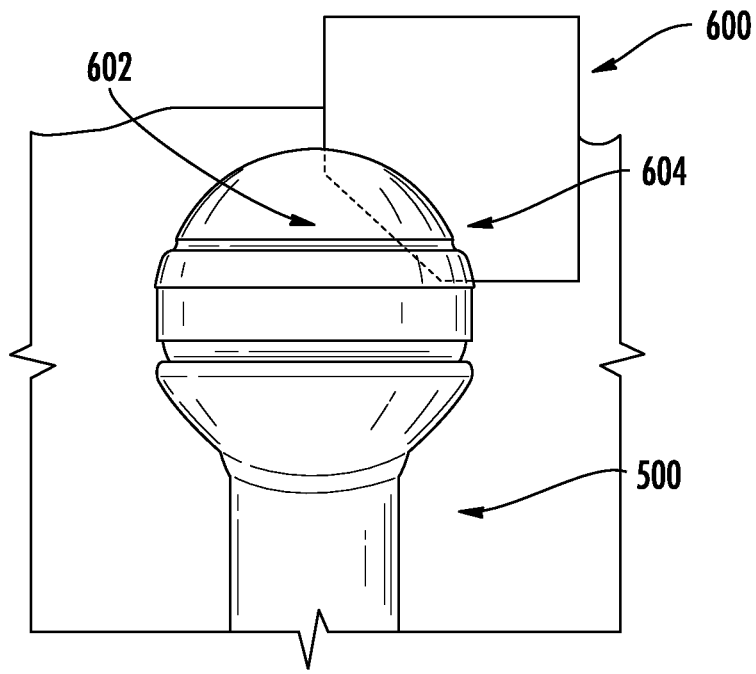
FIG. 6 is a rear view of another exemplary embodiment of a soft insert structure for a tool according to this disclosure.

In another embodiment illustrated in FIG. 6, the soft insert structure 314 includes a sealed air bladder 600. The bladder 600 is configured to adjust an amount of air disposed therein. For example, in this embodiment, the bladder 600 has an expanded shape 602 such that when the bladder 600 is expanded when mounted on the tool 500, the surface 604 expands to have a close fit with the tool 500. The amount of air in the bladder 600 can also be adjusted in order to adjust an amount of load applied on the tool 500.

In one embodiment, rather than being expanded by air, the bladder 600 includes an expandable foaming agent that is configured to expand and form the bladder 600 into the soft insert structure 314. In an example, a bladder 600 that includes a foaming agent is positioned between the tool and the tool holding portion 311. The foaming agent is then activated, such as by operating an activation tab (not shown) that, when pulled, causes the foaming agent to form foam, causing the bladder to expand around the tool, and forming the soft insert structure 314.

The soft insert structure 314 can have, for example, an air tight fit, a pressurized fit, or an open fit around the tool 500, whereby the type of fit affects an amount of resistance for insertion and removal of the tool from the tool holder 302. In one embodiment where the soft insert structure 314 includes an air bladder 600 as depicted in FIG. 6, the fit can be adjusted by adjusting an amount of air within the air bladder 600.

Figure 7:
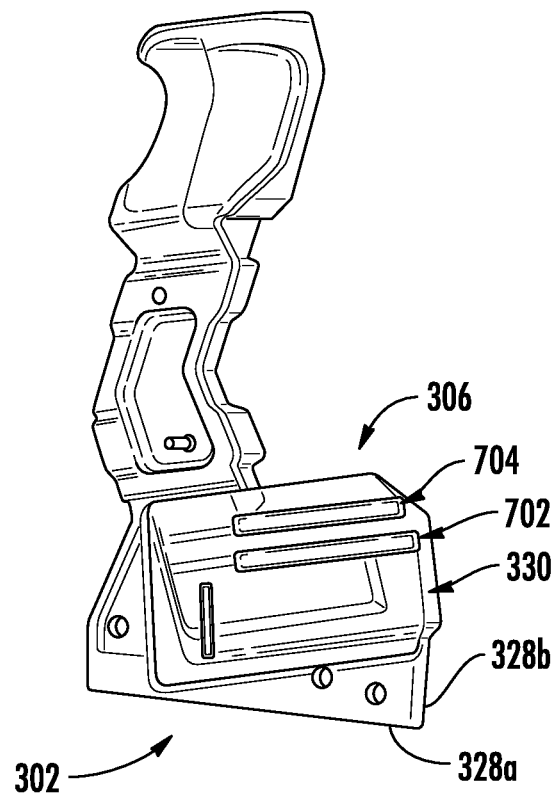
FIG. 7 is a perspective cross section view of a tool holder according to this disclosure.

During operation, transport, and storage, the tool holder 302 and a tool mounted thereon may be subjected to various vibration forces, such as road vibrations, or vibrations from other sources such as heavy machinery, and additional vibration damping may be beneficial. In the embodiment illustrated in FIG. 7, the tool holder 302 has a double-walled structure with an inner surface 328a and an outer surface 328b. A gap 330 between the inner surface 328a and outer surface 328b provides vibrational damping for the tool holder 302. In some embodiments, the gap 330 is filled with air, although filling the gap 330 with other materials such as a vibration damping material is also contemplated. In one aspect, the tool holder 302 has a blown molded structure configured to damp vibrations. In an example, the tool holder 302 can include one or more parts formed by a blow molding process and having a structure that provides structural dampening.

As described above, the tool holder 302 holds the tool in place relative to the charging module 100 to counteract external motions and vibrations. However, it is also desirable that installation and removal of the tool to and from the tool holder 302 is optimized so as not to interfere with ready use of the tool. In particular, it is desirable that a user be able to easily insert or remove the tool with one hand. Such one-handed manipulation is enabled by, for example, the angle 312 (FIG. 3) which enable the swiping motion described above, and also by adjusting an amount of resistance of the tool holder 302 exerts when installing or removing the tool. As described above, the amount of resistance can be adjusted by adjusting the fit of the soft insert structure 314. The amount of resistance can also be adjusted by adjusting a thickness of the material used to form the tool holder 302 and/or the docking frame 300. In another example, the amount of resistance can be adjusted by forming the tool holder 302 with a shape configured to form a seal or pressure fit with the tool.

Figure 8:
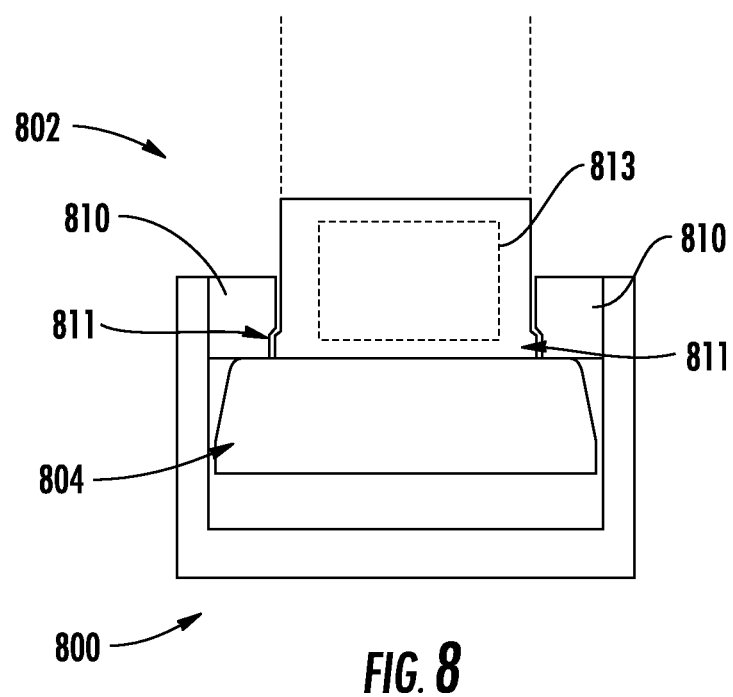
FIG. 8 is a front view of an exemplary tool holder according to this disclosure.

Because the efficiency of the charging of the battery is based at least in part upon the location of the battery with respect to the charging module 100, it may be desirable to further restrain the tool and/or docking frame 300 so as to facilitate an alignment between the battery and the charging module 100. FIG. 8 illustrates a front view of a tool holder 800, a tool 802 mounted in the tool holder 800, and a charging module 804 mounted in the tool holder 800. The tool holder 800 further includes stops 810 configured to engage a geometry 811 of the tool 802 to hold the tool 802 in place and to counteract a force of the charging module 804 against the tool 802. The tool 802 is thus held in a position for optimal charging of a battery 813 disposed therein.

The stops 810 also are configured to act as an indicator to a user that the battery is properly aligned with the charging module 804, i.e., when the stops 810 are engaged by the tool 802, the battery within the tool 802 is properly aligned. In other embodiments, stops similar to the stops 810 can be disposed on the charging module and configured to engage with the tool 802, disposed on a docking frame mounted in the tool holder 800, or can be disposed on the tool 802 and configured to engage with the charging module 804, a docking frame, or the tool holder 800.

Advantageously, the tool holder 302 and/or the docking frame 300 is configured to accommodate batteries, tools, and charging modules 100 of different sizes. In this embodiment, the second receiving interface 306 includes a first drawer slot 702 configured to receive a first charging module and/or docking frame, and a second drawer slot 704 configured to receive a second charging module and/or docking frame of a size larger than a size of the first charging module and/or docking frame.

Figure 9:
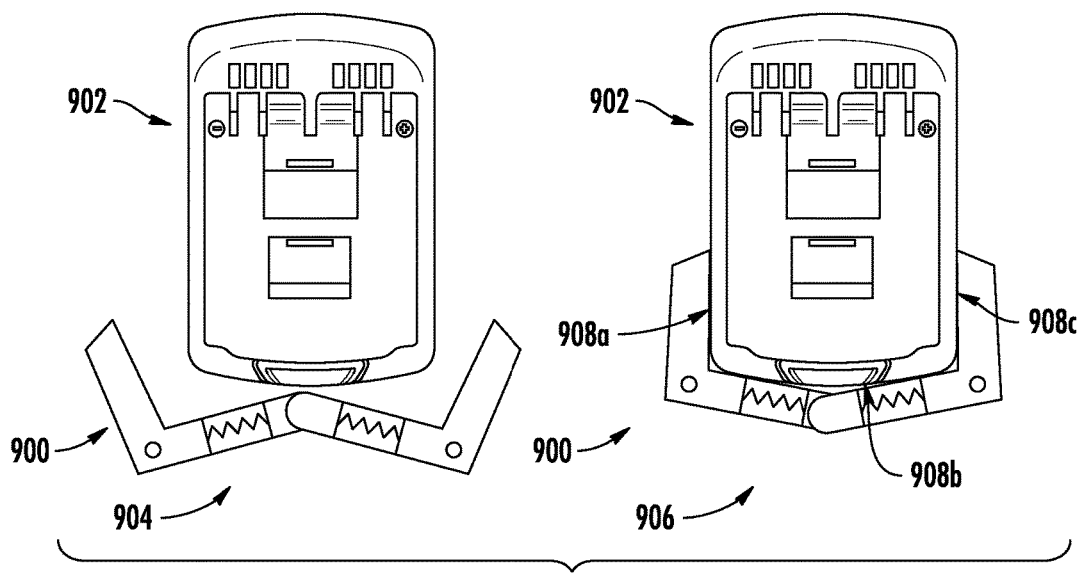
FIG. 9 is a top view of an exemplary embodiment of a clamping device for a tool according to this disclosure.

It may be desirable to further restrain a region of the tool having the battery. FIG. 9 illustrates a top view of an over-center clamp mechanism 900 configured to guide the region of the battery 902 into alignment with the charging module 100. The over-center clamp mechanism 900 can be, for example, included with the docking frame 300 and/or the tool holder 302 shown in FIGS. 3 and 4. The over-center clamp mechanism 900 is advantageously configured to close from an open position 904 to a closed position 906 as the region of the tool is inserted into the tool holder 302 such that the over-center clamp mechanism 900 is engaged with at least three sides of the tool 908a-c. In one embodiment, the over-center clamp mechanism 900 includes a spring (not shown) that is positioned at any acceptable location on the mechanism 900 and configured to apply a load when the over-center clamp mechanism 900 is in the closed position that acts to keep the region of the tool in alignment with the charging module 100.

Figure 10:
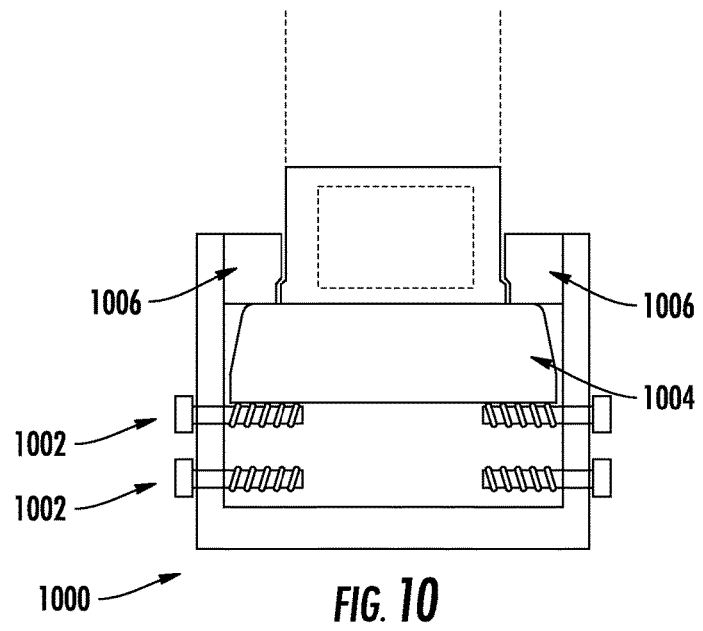
FIG. 10 is a front view of another exemplary embodiment of a tool holder according to this disclosure
Figure 11:
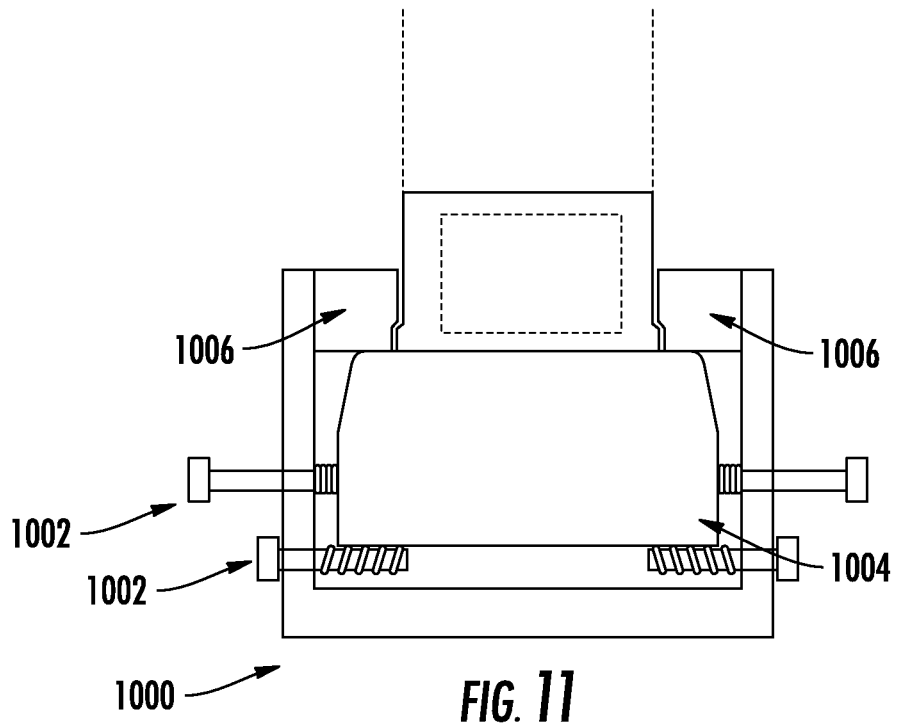
FIG. 11 is a front view of the tool holder of FIG. 10 with a different sized component inserted therein.

FIG. 10 illustrates a front view of another embodiment of a tool holder 1000 configured to accommodate different sizes of batteries and/or charging modules. The tool holder 1000 includes a plurality of spring loaded pin pairs 1002. The charging module 1004 rests on top of one of the spring loaded pin pairs 1002 that is spaced away from stops 1006 by a distance configured to receive the charging module 1004. FIG. 11 illustrates a front view of the tool holder 1000 whereby the topmost spring loaded pin pairs 1002 has been retracted such that the tool holder can receive a larger charging module 1104. The charging module 1104 thus rests on a spring loaded pin pairs 1002 below the spring loaded pin pairs 1002 retracted in order to accommodate the charging module 1104. In another embodiment, the charging module 1004 is mounted within the tool holder 1000 and rests on the lower spring loaded pin pairs 1002, and a larger battery region of a tool extends below the stops 1006.

Figure 12:
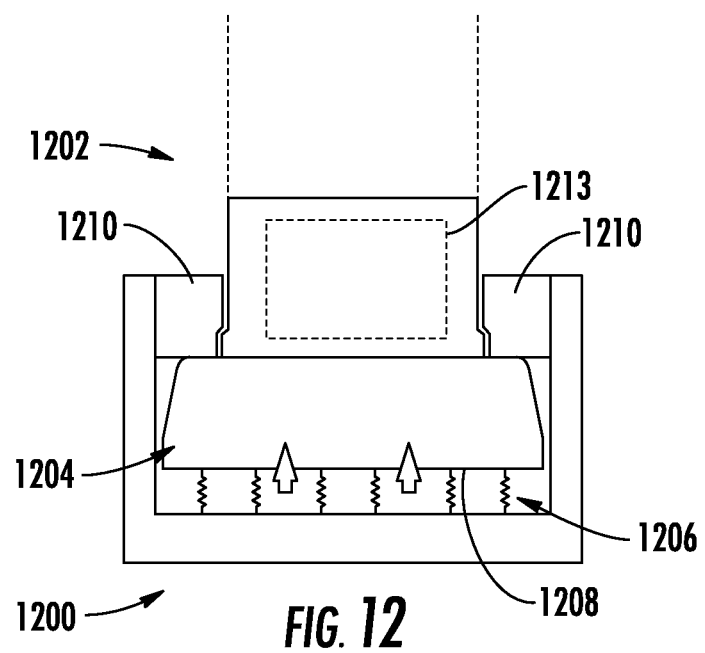
FIG. 12 is a front view of a tool holder having a pushing mechanism according to this disclosure.

It may be desirable for a tool holder to be configured to accommodate batteries and/or charging modules of variable size. Additionally, applying a load that urges the charging module 100 against the tool can be used to adjust the amount of resistance for installing and removing the tool as described above, as well as to keep the tool aligned with the charging module 100. FIG. 12 illustrates a front view of a tool holder 1200, a tool 1202 mounted in the tool holder 1200, and a charging module 1204 mounted in the tool holder 1200 and urged against the tool 1202. The tool holder 1200 includes a pushing mechanism 1206 configured to push on a bottom surface 1208 of the charging module 1204 such that the charging module 1204 is urged against the tool 1202. In an example, the pushing mechanism 1206 includes a spring and/or spring plate. The tool holder 1200 further includes stops 1210 configured to hold the tool 1202 in place and to counteract a force of the charging module 1204 against the tool 1202. The tool 1202 is thus held in a position for optimal charging of a battery 1213 disposed therein.

Figure 13:
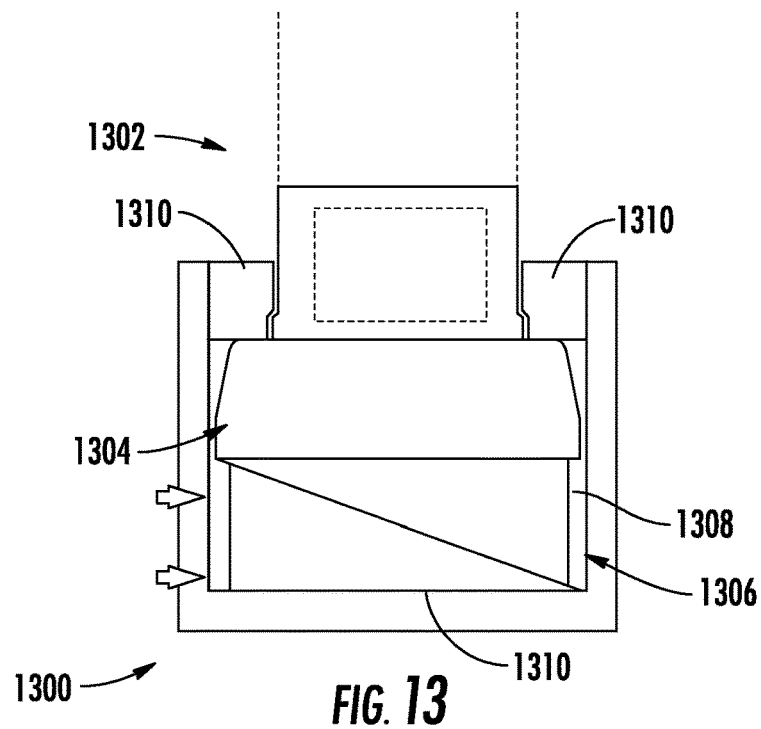
FIG. 13 is a front view of another embodiment of a tool holder having a pushing mechanism according to this disclosure.

FIG. 13 illustrates a front view of another embodiment of a tool holder 1300 configured to urge the charging module 1304 against the tool 1302. Rather than including a spring and/or a spring plate, the pushing mechanism 1306 includes a wedge 1308 and a pushing wedge block 1310. The pushing wedge block 1310 can be mounted on a threaded rod, for example, and can be pushed against the wedge 1308, for example, by adjusting the threaded rod, causing the wedge 1308 to push the charging module 1304 against the stops 1308 and the tool 1302.

Pushing devices, such as the pushing mechanisms 1206, 1306 described above can also be used to adjust for different size batteries and/or charging modules.

Figure 14:
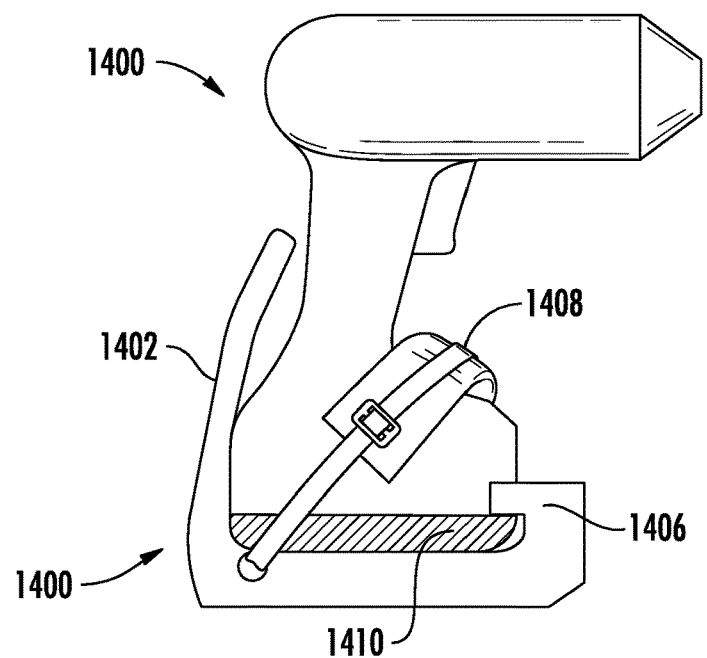
FIG. 14 is a side view of a tool holder having a strap mechanism according to this disclosure.

FIG. 14 illustrates another embodiment of a tool holder 1400 according to the disclosure. The tool holder 1400 includes a back member 1402 configured to apply a load to the tool 1400 mounted within the tool holder 1400 that acts to keep the tool 1400 optimally positioned related to the charging module 1410. The tool holder 1400 further includes a front stop 1406 configured to engage with at least one of the tool 1400 and the charging module 1410 and limit an extent of motion of at least one of the tool 1400 and the charging module 1410, and a strap 1408 configured to hold the tool 1400 in place. The strap 1408 is additionally configured to be tightened so as to apply a load that urges the tool 1400 against the charging module 1410.

Figure 15:
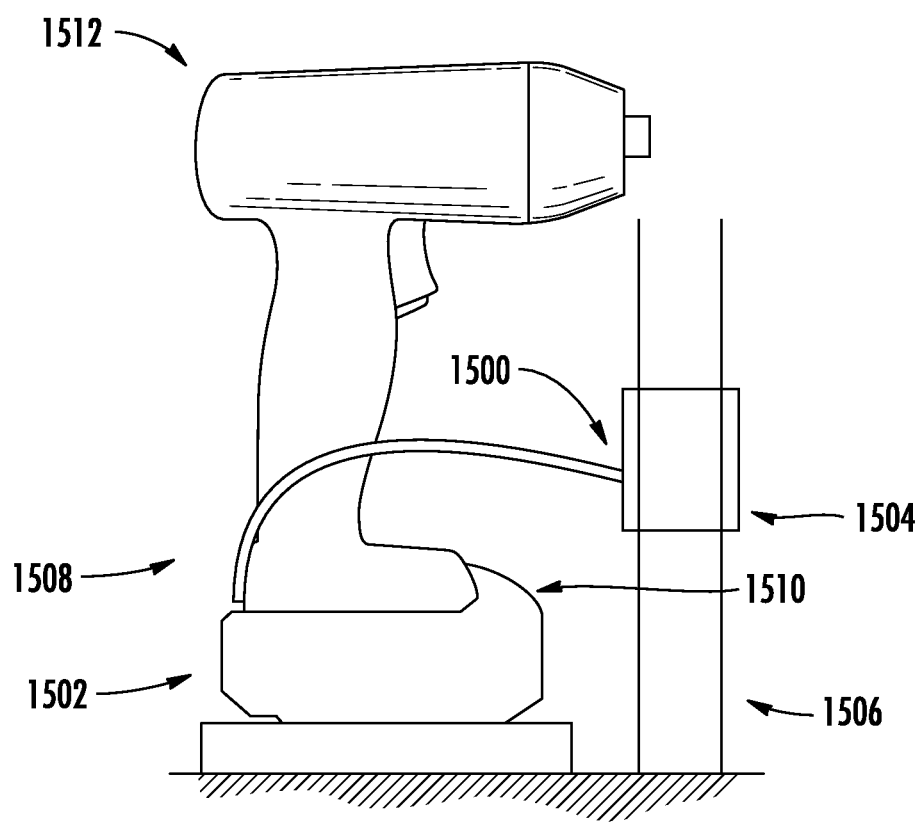
FIG. 15 is a side view of a tool holder having a clamp mechanism according to this disclosure.

FIG. 15 illustrates a further embodiment according to the disclosure. A clamp mechanism 1500 is configured to urge the tool 1512 against the charging module 1502, and includes a clamping end 1504 configured to engage with a restraining member 1506 such as a rod, pole, bar, pipe, etc., and a gripping end 1508 configured to engage with the tool 1512. In the embodiment, the gripping end 1508 includes gripping tines, but other types of gripping ends, such as a loop connection, clip connection, and pin connection are also contemplated. The charging module 1502 additionally includes a lip 1510 configured to hold the tool 1512 captive on the charging module 1502 in conjunction with the clamp mechanism 1500. The clamp mechanism is advantageously configured to have an adjustable length such that a variety of thickness of the tool 1512 and charging module 1502 can be accommodated.

In a further embodiment the docking frame 300 and/or the tool holder 302 includes a cord guide configured to guide a power cord out from the charging module, through the docking frame 300 and/or tool holder 302, such that the power cord to be connected to a power source is unobstructed by the docking frame 300 and/or tool holder 302.

It is contemplated that different tool holders and docking frames may be configured to be used with different tools, and so to may different charging modules be configured to be used with different batteries and with different docking stations. Thus, in a further embodiment, a plurality of different tool holders are configured to be used with different docking frames and charging modules of different sizes and powers via common interfaces.

In an example, a first docking frame is mounted within a tool holder, and houses a first charging module. The first tool holder and the first charging module are configured to work with a first tool. When a second tool is desirably charged, the first docking frame is removed from the tool holder, and a second docking frame housing a second charging module is inserted therein, wherein the second charging module is configured to charge the second tool, and wherein the second docking frame has a mounting interface configured to engage with the receiving interface of the tool holder. In other words, tool holders, docking frames, and charging modules may be mixed and matched as desired due to common mounting and receiving interfaces.

In an exemplary embodiment according to this disclosure, a tool holder includes a receiving interface, and tool holding portion. The interface is configured to receive a wireless charging module for charging a battery positioned within a tool, and the holding portion is configured to receive the tool and apply a load to the tool that acts to hold the tool in alignment with the charging module for optimal charging of the battery. The tool holder has an attachment surface that can be affixed to a rigid surface.

In one embodiment, the receiving interface includes a removable docking frame that has a second receiving interface configured to engage a mounting interface of the charging module.

In an embodiment, the tool holding portion is adjustable to adjust an amount of resistance for installing or removing the tool therein.

In one embodiment, the tool holding portion includes a soft insert structure configured to receive the tool with an interference fit, wherein at least part of the load is applied by the soft insert structure. The soft insert structure is removably inserted in the tool holding portion, and is configured to receive a particular tool.

In one embodiment, the tool holder includes a positive stop configured to engage with and hold the tool such that the battery is aligned with the charging module. The positive stop is further configured to act as an alignment indicator that indicates that the battery is optimally aligned with the charging module.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A wireless charging system, comprising:
    a tool holder that includes:
        a mounting interface; and
        a holding portion that extends from an end region of the mounting interface, and that includes a removable insert structure that has a material that is soft relative to the tool holder, and that has a bladder that defines a cavity; and
    a charging module that defines a charging surface, that is removably mountable in the mounting interface of the tool holder, and that includes an inductive charging device configured to wireless charge a wirelessly rechargeable battery of a device resting on the charging surface;
    the holding portion having a shape configured to at least partially engage a geometry of a body of the device such that the holding portion acts as a transverse support for the device relative to the mounting interface,
    the bladder configured to form an interference fit between the cavity and at least a portion of the body of the device as the bladder is expanded therebetween,
    the holding portion configured to apply a load to the body of the device resting on the charging surface such that the device is (i) at least partially compressed between the holding portion and the charging surface when resting on the charging surface and (ii) urged toward a location within a wireless charging tolerance zone of the charging module, and
    the removable insert structure of the holding portion configured to apply at least a portion of the load to the body of the device.

2. The system of claim 1, wherein the expansion of the bladder is adjustable.

3. The system of claim 1, wherein the bladder includes a foaming agent disposed therein that forms foam to expand the bladder upon activation.

4. A wireless charging system, comprising:
    a tool holder that includes:
        a mounting interface; and
        a holding portion that extends from an end region of the mounting interface, and that includes a removable insert structure that includes:
            a rigid shell that is removably mountable within the holding portion of the tool holder; and
            a receiving area that has a material that is soft relative to the tool holder; and
    a charging module that defines a charging surface, that is removably mountable in the mounting interface of the tool holder, and that includes an inductive charging device configured to wireless charge a wirelessly rechargeable battery of a device resting on the charging surface;
    the holding portion having a shape configured to at least partially engage a geometry of a body of the device such that the holding portion acts as a transverse support for the device relative to the mounting interface,
    the receiving area of the removable insert structure configured to receive at least a portion of the body of the device, and defining a cavity sized for an interference fit with at least a portion of the body of the device,
    the holding portion configured to apply a load to the body of the device resting on the charging surface such that the device is (i) at least partially compressed between the holding portion and the charging surface when resting on the charging surface and (ii) urged toward a location within a wireless charging tolerance zone of the charging module, and
    the removable insert structure of the holding portion configured to apply at least a portion of the load to the body of the device.

5. The system of claim 4, wherein the tool holder further includes at least one stop member that has a shape configured to engage at least a portion of the geometry of the body of the device, and that delimits an installation region for the device such that the battery of the device is located within the tolerance zone of the charging module.

6. The system of claim 4, further comprising a strap that is configured to restrain the device within the tool holder.

7. The system of claim 4, wherein walls of the tool holder have double-walled structures that are each formed by a first wall and a second wall and a gap defined therebetween.

8. The system of claim 7, wherein a damping material is disposed within the gap.

9. The system of claim 4, wherein the mounting interface includes a docking frame separate from the charging module that is removably mounted within the tool holder, and that includes a receiving interface for mounting the charging module.

10. The system of claim 9, wherein the docking frame includes a pushing device that applies a load directly to the charging module that urges the charging module toward the power tool in opposition to the load applied by the holding portion.

11. The system of claim 10, wherein at least one of the pushing device and removable insert structure is adjustable in order to adjust a compression of the power tool in the tool holder.

12. The system of claim 4, further comprising a pushing device that is disposed in the mounting interface of the tool holder, and that directly applies a load to the charging module that loads the charging module toward the holding portion such that the charging module is configured to apply a load to the device in opposition to the load applied by the holding portion.

13. The system of claim 12, wherein the pushing device includes at least one spring mounted on the mounting interface of the tool holder that is configured to bias the pushing device toward the holding portion.

14. The system of claim 12, wherein the pushing device includes an adjustment member that is operable to adjust the load applied by the pushing device.

15. A wireless charging system, comprising:
a tool holder that includes:
  a first mounting interface; and
  a holding portion that extends from an end region of the first mounting interface, and that includes a soft insert structure;
a docking frame removably mountable in the first mounting interface, the docking frame including:
  a second base surface; and
  a second mounting interface; and
a charging module that defines a charging surface, that is removably mountable in the second mounting interface, and that includes an inductive charging device that defines a wireless charging tolerance zone;
a power tool that includes a wirelessly rechargeable battery, and that is disposable on the charging surface of the charging module such that the holding portion at least partially transversely supports the power tool relative to the first mounting interface,
  the soft insert structure defining a cavity sized for an interference fit with at least a portion of the power tool, and applying a load to the power tool in a direction toward the charging surface such that the power tool is at least partially compressed between the holding portion and the charging surface and urged toward a location such that the battery is within the wireless charging tolerance zone, and
  the induction charging device configured to wirelessly charge the battery;
a further power tool having a geometry that is different from the geometry of the power tool; and
a further soft insert structure that defines a further cavity sized for an interference fit with the further power tool, and that is configured to replace the soft insert structure to enable the tool holder to receive the further power tool with an interference fit.

16. The system of claim 15, further comprising at least one of: a strap configured to restrain the power tool within the tool holder; and a clamping device that includes at least one clamping arm, and that is actuatable between
  a first position whereat the at least one clamping arm engages the power tool to hold the power tool captive within the tool holder, and
  a second position whereat the at least one clamping arm is released from the power tool.

17. The system of claim 15, wherein at least one of the tool holder and docking frame further includes at least one stop member that delimits an installation location of the power tool so that the battery is within the wireless charging tolerance zone.

* * * * *